(12) United States Patent
Bribach et al.

(10) Patent No.: US 8,141,294 B2
(45) Date of Patent: *Mar. 27, 2012

(54) VERTICAL GARDEN PANEL

(76) Inventors: Christopher James Bribach, San Francisco, CA (US); Daniel Rossomano, San Francisco, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 12/807,299

(22) Filed: Sep. 2, 2010

(65) Prior Publication Data

US 2011/0059518 A1     Mar. 10, 2011

Related U.S. Application Data

(60) Provisional application No. 61/240,204, filed on Sep. 5, 2009.

(51) Int. Cl.
*A01G 9/02* (2006.01)
(52) U.S. Cl. .............................. 47/83; 47/65.7
(58) Field of Classification Search ............ 47/65.5, 47/65.7, 65.8, 65.9, 66.1, 66.3, 66.5, 66.7, 47/67, 75, 80, 82, 83
See application file for complete search history.

(56) References Cited

U.S. PATENT DOCUMENTS

| 2,945,238 A | * | 7/1960 | Weiser | 112/427 |
| 2011/0059518 A1 | * | 3/2011 | Bribach et al. | 435/266 |
| 2011/0215937 A1 | * | 9/2011 | Carroll et al. | 340/604 |

FOREIGN PATENT DOCUMENTS

| DE | 3607771 A1 | * | 9/1987 |
| DE | 4116772 A1 | * | 12/1991 |
| FR | 2680626 A1 | * | 3/1993 |
| GB | 2152345 A | * | 8/1985 |
| JP | 54010107 A | * | 1/1979 |

* cited by examiner

*Primary Examiner* — Frank T Palo

(57) ABSTRACT

Embodiments of the invention provide a planter system for supporting living plants on a vertical surface that includes a fabric folded into one or more vertically-arranged knife pleats; the pleats are secured and horizontally segmented into vertically arranged, upward facing pockets by a securing mechanism. The upward facing pockets are adapted hold a plant growth medium. Other aspects of the invention include a simple system for removing failing plants, and replacing them with healthy plants, already embedded in growth medium within a root liner pouch. The invention further includes an irrigation system.

16 Claims, 4 Drawing Sheets

VERTICAL GARDEN PANEL

CROSS-REFERENCE TO RELATED APPLICATIONS

This application claims priority to U.S. Provisional Patent Application No. 61/240,204 of Bribach, entitled "Pleated Pocket Planter", as filed on Sep. 5, 2009.

TECHNICAL FIELD

The invention relates to a system for growing plants. More particularly, the invention relates to a system for growing plants in a system arranged vertically on a wall.

BACKGROUND

Facade greening can dramatically reduce the temperature of buildings by shading walls from the sun. Walls of plants are also highly effective at trapping dust and airborne pollutants as well as producing oxygen through photosynthesis. Wall planters allow for a large number of plants to be concentrated on the surface of a building. Not only do plants have positive psychological effects for people within the workplace, plants can also remove a range of organic pollutants from enclosed atmospheres, and remedy toxic building syndrome. Plants grown on the exterior of buildings can also protect the surface from solar decay, as well as offer developers tax savings from LEED (Leadership in Energy and Environmental Design) points generated by a living wall installation.

Walls filled with a large variety of plants require a structure for supporting their roots, generally within a growth medium, and an irrigation system for providing moisture and nutrients. Individual containers can be used to support plants, however roots tend to become bound and watering is difficult to manage. Other methods include costly frameworks that contain root balls in plastic housings that are heavy and difficult to install. Some systems use pre-grown panels, but these systems take many months to prepare and do not allow for a simple changing out of plants if one of them begins to fail or dies. There are also simple fabric bags that can be hung on the wall, however these can cause rot damage to building structure, as such fabric bags do not allow for air circulation against the building membrane. Other green wall approaches include hydroponic systems that require costly nutrient monitoring devices.

The invention provided herein resolves a number of these issues that limit and complicate the development and proliferation of façade greening.

SUMMARY OF THE INVENTION

Embodiments of the invention include planter system and methods for supporting living plants on a vertical surface. The planter system includes a fabric folded into one or more vertically-arranged knife pleats, the pleats secured and segmented into upward facing pockets or growth compartments by a securing mechanism, the upward facing pockets adapted to hold a plant growth medium. Fabric of the system may be fabricated from any suitable material; in some embodiments, the fabric is processed into a felted material. Attributes that favor suitability include fabric strength, durability, and wettability, such that the fabric provides a wicking path for water transport. In some embodiments, the fabric includes material selected from the group consisting of polyester/acrylic tangle material, synthetic fibers, adhered synthetic fibers, natural fibers, glass, ceramic, metal, plastic, or stone.

Embodiments of the planter system of include a plurality pleats, the pleats are typically, but not necessarily, arranged in parallel horizontally, and vertically stacked.

Embodiments of the planter system of include a securing mechanism, to secure the pleats as folded; the securing system segregates vertically folded sheets of fabric into separate growth compartments or pockets that are arranged horizontally as a row. As pockets are formed by the combination of pleats and securing points, the formed pockets may be seen to form a pattern or array of pockets. The securing system may include any of adhesives, glue, synthetic fiber stitches, pins, tacks, wire, metal bindings, or solid framing.

Embodiments of the planter system may further include one of more removable pouches (root liners or root wrappers) that are configured to fit into the upward facing pockets, and which allow for an uncomplicated change out of one pouch for another. By this approach, a failing or dead plant can be easily removed and replaced with a fresh pocket, having a new plant. The fabric of the removable pouches is typically drawn from the same set of materials used in the manufacture of the fabric of the system as a whole. Embodiments of the invention also include a system for holding and maintaining plants in the root liner pockets separately from the vertical plant growing system itself. With this adjunct plant growing system, plants can already be well established prior to their being transferred into the vertical plant system.

Embodiments of the planter system include an irrigation system to convey water to each of the growth compartments, and to allow egress of excess water. The irrigation system includes tubing adapted to convey fluid from a fluid source to the pockets and to remove excess fluid from the pockets. In some embodiments of the irrigation system, the irrigation tubes include holes that allow escape of fluid from the tubing, and a fluid escape path allows the fluid to flow into the fabric, the fabric itself forming a fluid flow path.

Embodiments of the planter system include a channeled frame, the frame having three sides connected or folded to contain water and moisture. The channeled frame provides an attractive finish to the raw edges of the felt. The channeled frame also contains moisture within the system. The channeled frame can be made from individual bottom, top, and side pieces that can be assembled to create the enclosure.

In some embodiments, the channeled frame includes edge corners that are sealed with a waterproof sealant comprising materials selected from the group consisting of non-corrosive materials galvanized steel, painted metal, aluminum, carbon fiber, plastic, or vinyl. In some embodiments, the channeled frame is positioned over a water storage tank that includes a water pump adapted to circulate water through the system. In still other embodiments of the planter system, an automatic timer or moisture sensing device is included, to control automatic watering of plants contained in the system.

Embodiments of the planter system also include the pleated fabric attached solely to itself without a supporting backing board so it can be rolled and transported with greater ease. The flexible sheet can be suspended like a curtain or pinned at the edges to create a support system for living plants.

Embodiments of the planter system also include the ability to use the felt membrane within an air circulation system as an air filter that can break down and neutralize toxic particles captured from the air. The microbial activity in soil has the ability to use and reduce large molecules to basic elements that plants require for nutrient absorption through their roots.

Embodiments of the planter system also include the use of multiple layers of felt that allow for color and patterned materials for decorative purposes as well as the enhancement of absorption properties of the membrane.

DESCRIPTION OF THE INVENTION

A vertical garden panel, as provided by embodiments of the invention, resolves a number of issues that make currently available façade greening systems less than fully satisfactory. The system provided herein is lightweight, inexpensive, and can make use of recycled non-toxic felt materials that allow for the simple insertion of plants already stabilized in their own soil. As the plants grow their roots integrate into a thick plastic non-degrading felt. Plants can simply be removed as desired by pulling them from the pockets, and be replaced with a new plant. The panels of the system are backed with a rigid plastic board that provides a lightweight framework to support the planted pockets, and further, prevents moisture from touching the wall upon which the system is mounted. The pleated method of system construction is easy to manufacture, which also makes the system affordable. The pleated fabric of the vertical plant growth system directs water to wick away from the front of the panel keeping the front surface dry, while wicking water to the plants below. Embodiments of vertical garden panels, as provided by the invention, are versatile in that they can also be used for hydroponic applications, where any choice of growing medium can be applied to the pockets. Embodiments of the vertical garden panels have a wide range of uses including green urban renewal, office and retail décor, education, noise reduction, water and air filtration, energy and water conservation, food production, and any application for growing plants on walls. In terms of efficient utilization of space, vertical garden panels conserve horizontal indoor space, generally a floor, for example, and exploit generally otherwise unused vertical space.

Figure 1:
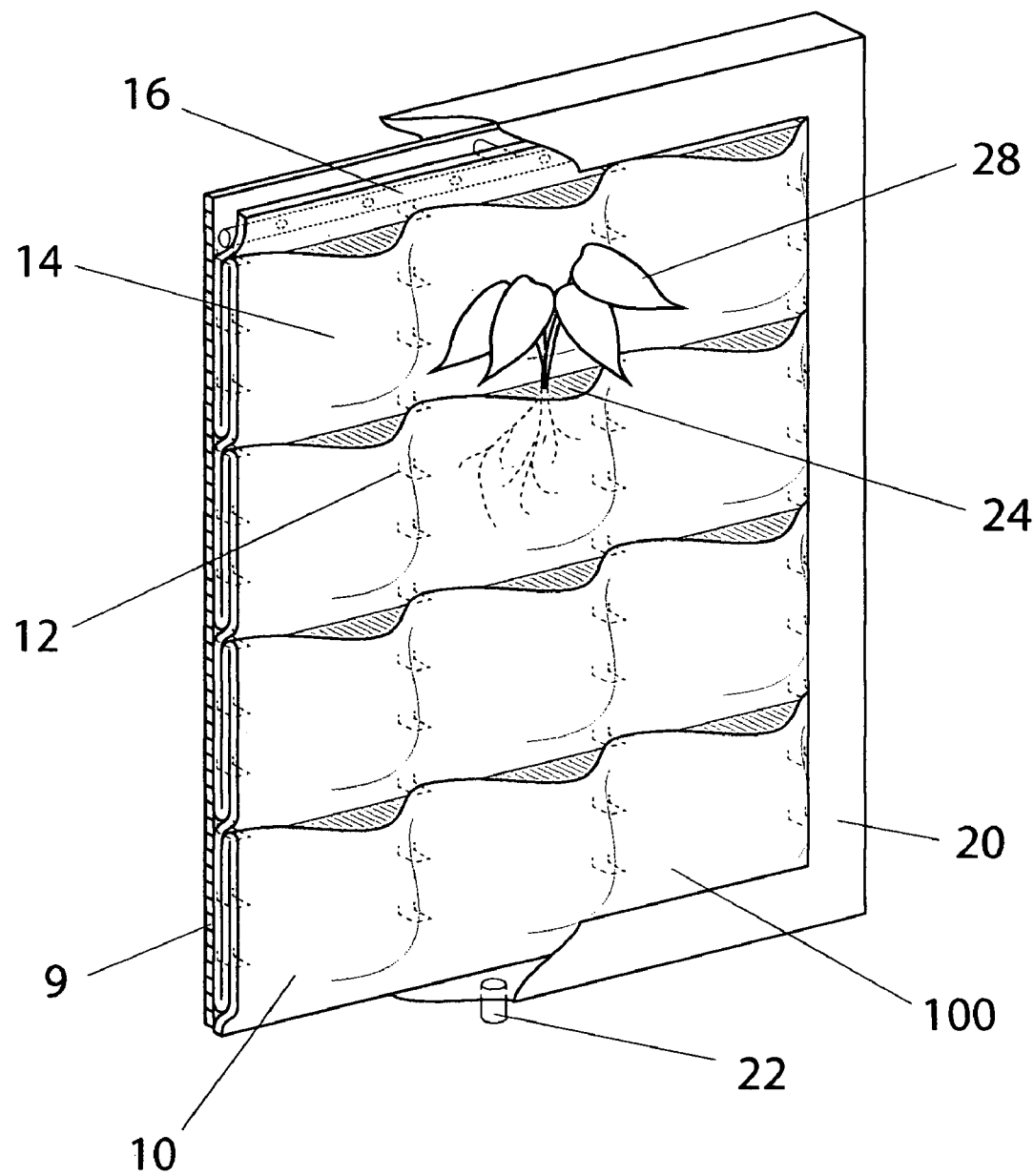
FIG. 1 provides an exploded view showing components of an embodiment of the invention, a system for supporting living plants on a vertical surface.

FIG. 1 provides a perspective view of an embodiment of the invention. A vertically arranged planter system 100 for living plants is fabricated substantially of a fabric, typically a felt membrane 10 that is folded in a knife pleat configuration. The pleats are connected by a securing mechanism 12 to create an array of pockets 14 that support a growing medium 24 and plants 28. The pleated pocket planter allows for the watering of plants 28 from irrigation tubing 16, the collection of excess water in a channeled frame 20, and removal of excess water through a water outlet 22.

Figure 2:
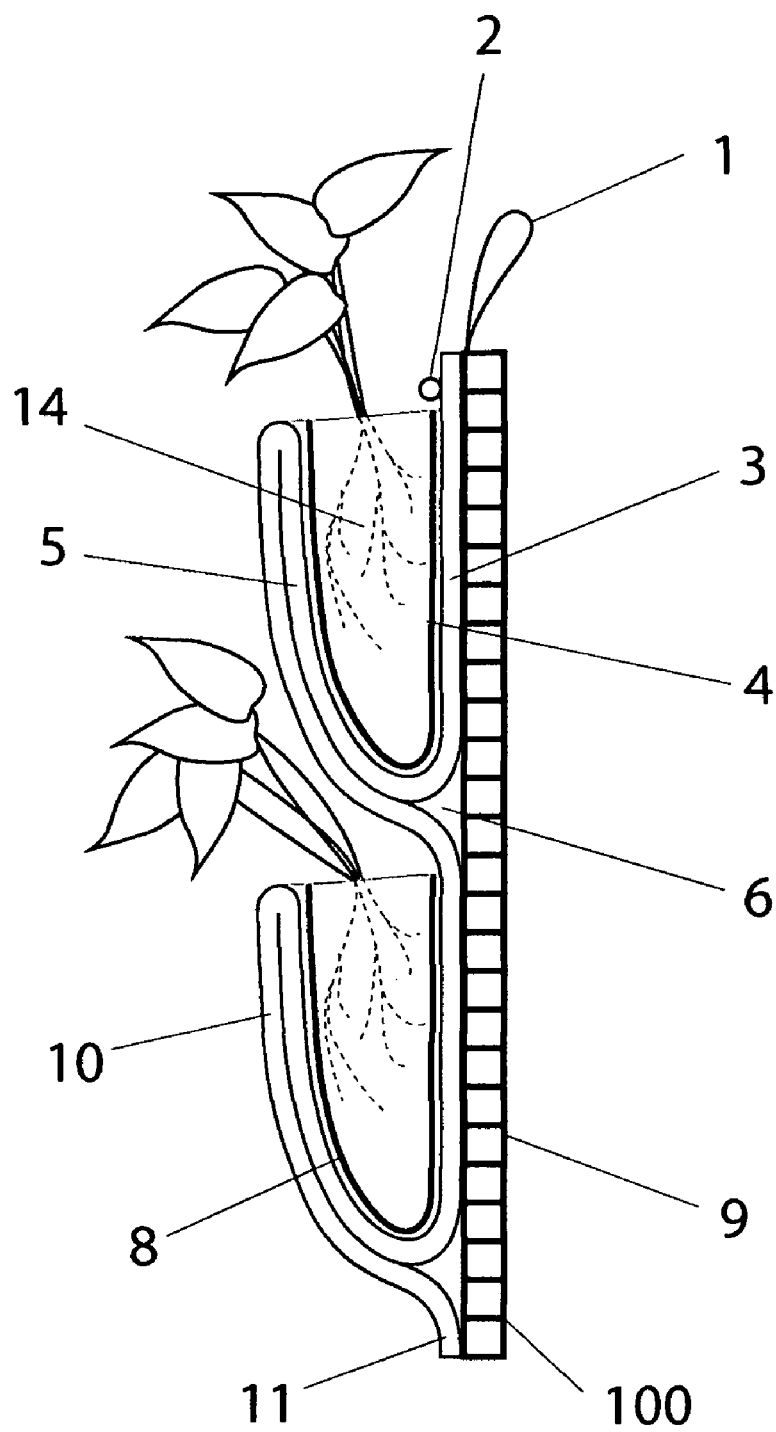
FIG. 2 provides a side view of the system for supporting living plants, with details that relate to the system and to methods for operating the system.

FIG. 2 provides a side view of the system for supporting living plants, with details that relate to the system and to methods for operating the system. The system, as a whole, can by hung or mounted on wall or amenable vertical surface by hanging tabs 1. The system can be irrigated by providing water at a top level 2 of the system; irrigation may occur by any conventional irrigation system or by hand. Water, having entered the system, wicks downward 3. As water wicks down, it flows down a water concentration gradient, and into the growth medium 4 within pockets or growth compartments 14 of the system, where it is available to plant roots. Air also enters the system 5, through the fabric material, or through the surface of the growth medium. A removable felt pouch or rootliner 8 allows for simple insertion and removal of plant material. Water continues to flow by capillary action 6 from the upper level of the system to the lower level of the system, where it enters into growth compartments below.

Root wrappers 8 are shown lining a growth compartment, where they serve as a containment layer that contributes to containing soil within the compartment, and generally enhances the efficiency of wicking; this layer may be made from the same materials as the fabric. Root wrappers provide a way to easily change out plants from the vertical growth system, and may be prepared with growing plants, prior to their insertion into the vertical planter system.

A lightweight rigid plastic backing board 9 supports the plants and protects the wall. The open fluted plastic board also prevents condensation on the back. Excess water 11 drips from the bottom of the panel, where it can be collected and drained, or recirculated, or directed to a planter system below.

The fabric of the planter system may be made of any suitable material, such material needing to be wettable, of sufficient strength and integrity to support wet growth medium and plants for the long term. In some embodiments, the fabric is a felted or otherwise non-woven material, which may be made from non-woolen materials, such as recycled PET plastic water bottles. Other suitable materials include polyester/acrylic tangle material, synthetic fibers, adhered synthetic fibers, natural fibers, glass, ceramic, metal, plastic, or stone.

Figure 3:
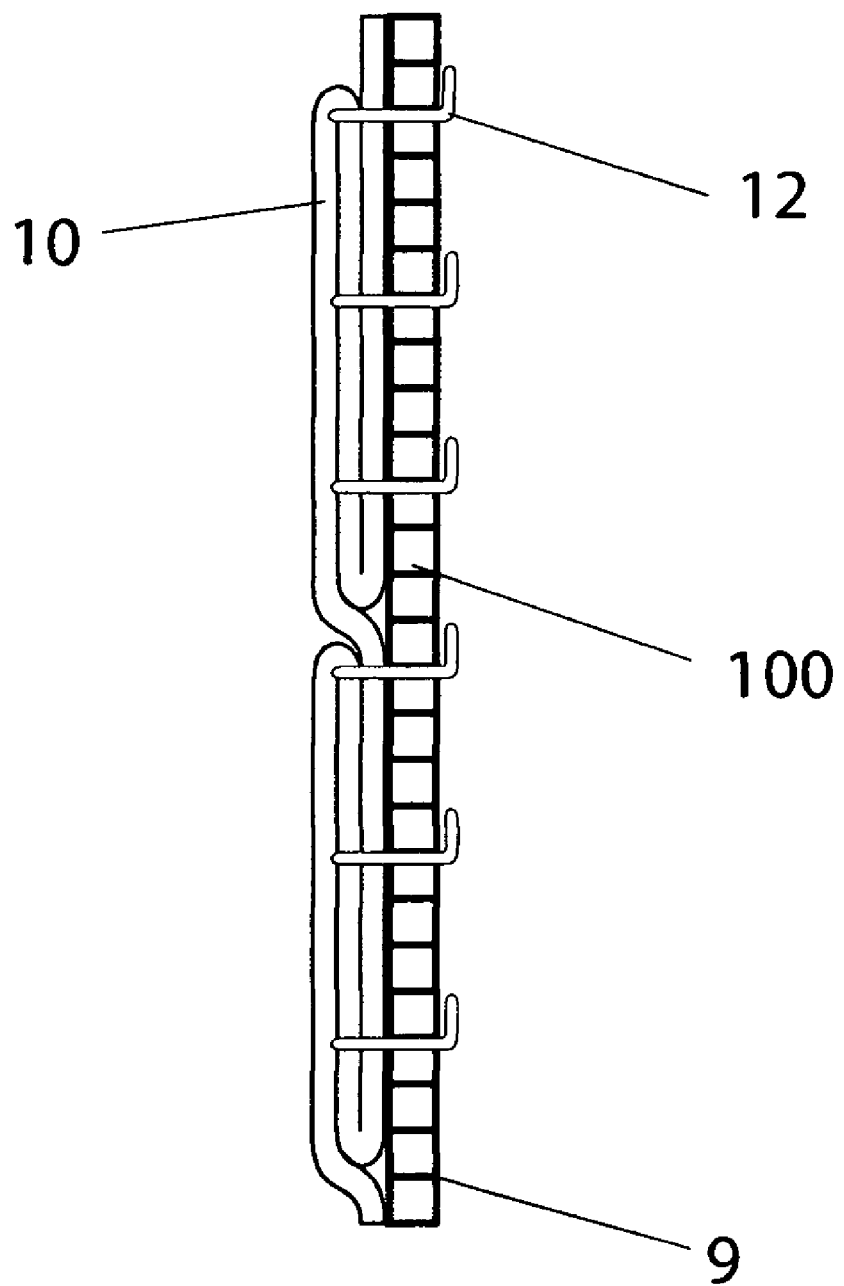
FIG. 3 provides a side view of the attachment mechanism showing how the pleated felt is attached to the backing board.

FIG. 3 provides a side view of an embodiment of vertically arranged planter system 100 for living plants, with a focus on details of the felt 10 as it is attached to the mounting board in a knife pleat configuration. The knife pleats may be understood as a folding configuration that begins at the top of the fabric of the planter system, and extends a distance downward to form a pocket or growth compartment of desired pocket depth. The fabric is layered onto itself to return a fold of fabric to top of the pocket of the fabric. Extending further below the upper fold, a second fold is created; the fabric is layered a third time on itself and extended again to the distance of desired pocket depth. Thereafter, extending still further below, again, the process is repeated at the top of the next pocket; and the assembly method continues until the desired number of pockets is created.

Figure 4:
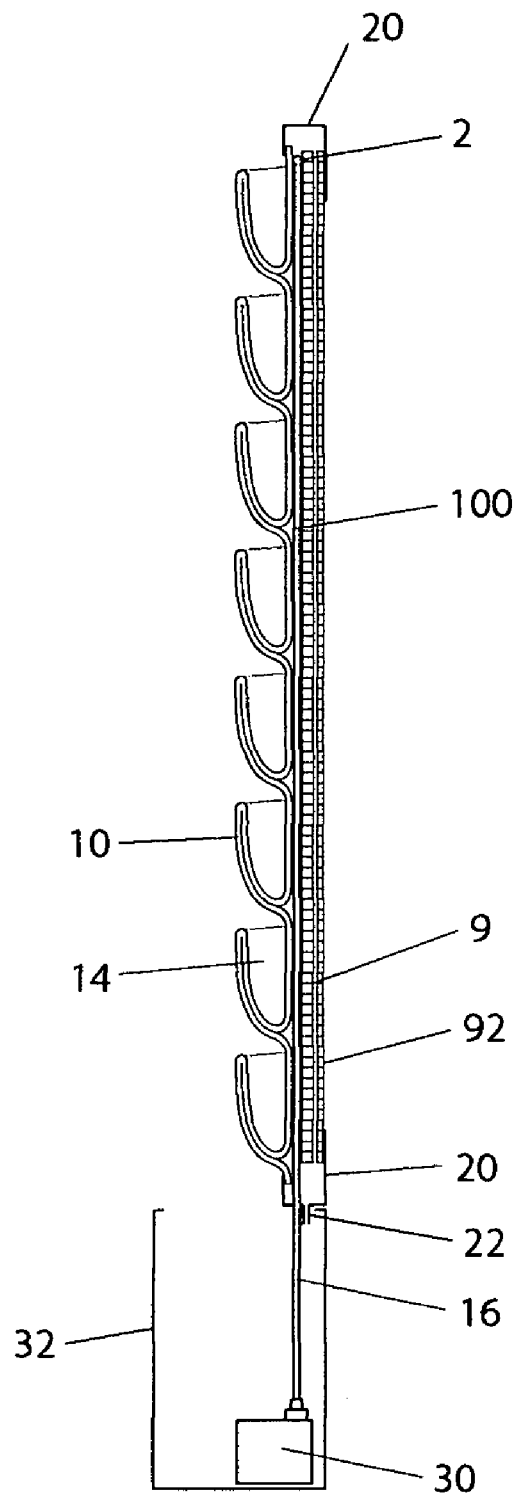
FIG. 4 provides a side view of a complete system that incorporates the channeled frame, water collection tank and water circulation pump.

FIG. 4 provides a side view of the of an embodiment of vertically arranged planter system 100 for living plants that includes a channeled frame 20 to support the vertical garden with an additional moisture protective panel 9. Water is circulated through the system with water pump 30 that is connected to an irrigation tube 16 that lifts water to the top of the panel and is released into the felt through emitter holes 2. Water then wicks down through the felt 10 and absorbed into the growth compartments 14. Water not absorbed by the plants is collected at the bottom portion of the channeled frame 20 and drained out the bottom through the water outlet 22 and into the water storage tank 32 where is it stored for future use.

The invention claimed is:

1. A planter system for supporting living plants on a vertical surface comprising: a fabric folded into one or more vertically-arranged knife pleats, the pleats secured and segmented into upward facing pockets by a securing mechanism, the upward facing pockets adapted to hold a plant growth medium.

2. The planter system of claim 1, wherein the fabric comprises material selected from the group consisting of polyester/acrylic tangle material, synthetic fibers, adhered synthetic fibers, natural fibers, glass, ceramic, metal, plastic, or stone.

3. The planter system of claim 1, wherein the system comprises a plurality of pleats, the pleats arranged in parallel horizontally, and vertically stacked.

4. The planter system of claim 1, wherein the securing mechanism is selected from the group consisting of adhesives, glue, synthetic fiber stitches, pins, tacks, wire, metal bindings, and solid framing.

5. The planter system of claim 1, further comprising an irrigation system that includes tubing adapted to convey fluid from a fluid source to the pockets and to remove excess fluid from the pockets.

6. The planter system of claim 5, wherein the irrigation tubes comprise holes that allow escape of fluid from the tubing, and wherein a fluid escape path allows the fluid to flow into the fabric, the fabric itself forming a fluid flow path.

7. The planter system of claim 1, further comprising a removable pouch that allows for the simple insertion and removal of plant material.

8. The planter system of claim 1, further comprising a channeled frame, the frame comprising three sides connected or folded to contain water and moisture.

9. The planter system of claim 8, wherein the channel frame comprises edge corners that are sealed with a waterproof sealant comprising materials selected from the group consisting of non-corrosive materials galvanized steel, painted metal, aluminum, carbon fiber, plastic, or vinyl.

10. The planter system of claim 8, wherein the channeled frame is operably connected to a water storage system, the water storage system comprising a holding tank and a pump adapted to circulate water through the planter system.

11. The planter system of claim 10, further comprising any of an automatic timer or moisture sensing device to control automatic watering of plants contained in the system.

12. The planter system of claim 1, wherein the pleated material is attached solely to itself to create a flexible panel that can be folded or rolled.

13. The planter system of claim 1, wherein the pleated material may consist of multiple layers that alter the appearance and mechanical properties of the planter system.

14. The planter system of claim 1, further comprising a containment housing enclosure comprising of a single sheet of material folded to provide support for the membrane and contain water.

15. The planter system of claim 10, further comprising of a mechanical fan and plenum enclosure behind the membrane that creates air pressure against the membrane therein causing air to move through the membrane which captures dust particles to create a method to filter air.

16. The method to filter air of claim 15, wherein the dust particles are biologically neutralized by microbial activity surrounding the root system of living plant material supported by the membrane.

* * * * *